(12) United States Patent
Kanaoka et al.

(10) Patent No.: US 7,486,424 B2
(45) Date of Patent: Feb. 3, 2009

(54) HOLOGRAPHIC RECORDING APPARATUS

(75) Inventors: Toshikazu Kanaoka, Kawasaki (JP); Akiyoshi Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/153,821

(22) Filed: May 23, 2008

(65) Prior Publication Data

US 2008/0231923 A1  Sep. 25, 2008

(51) Int. Cl.
G03H 1/26 (2006.01)
G11B 7/00 (2006.01)
(52) U.S. Cl. .......................... 359/22; 369/103
(58) Field of Classification Search ............. 359/1, 359/3, 22; 369/103
See application file for complete search history.

(56) References Cited

U.S. PATENT DOCUMENTS

2007/0140090 A1* 6/2007 Yamakage et al. .......... 369/103

FOREIGN PATENT DOCUMENTS

| JP | 2000-89650 | 3/2000 |
| JP | 2005-251333 | 9/2005 |

OTHER PUBLICATIONS

International Preliminary Report on Patentability mailed on Jun. 5, 2008 and issued in corresponding International Patent Application No. PCT/JP2005/021531.

English language version of the International Search Report mailed Mar. 7, 2006 in connection with the International Application No. PCT/JP2005/021531.

* cited by examiner

Primary Examiner—Alessandro Amari
(74) Attorney, Agent, or Firm—Staas & Halsey LLP

(57) ABSTRACT

The present invention relates to a holographic recording apparatus that records on a multiple basis information on a holographic memory. An object of the present invention is to provide a holographic recording apparatus capable of avoiding problems of recording error of data and destruction of the existing data, which will occur when the medium of the specification shortages is used.

5 Claims, 13 Drawing Sheets

HOLOGRAPHIC RECORDING APPARATUS

This application claims the benefit under 35 U.S.C. Section 371, of PCT International Application Number PCT/JP2005/021531, filed Nov. 24, 2005, the contents of which are incorporated herein by reference.

TECHNICAL FIELD

The present invention relates to a holographic recording apparatus that records information on a holographic memory.

BACKGROUND ART

Hitherto, there is known an information recording apparatus that records information in a portable type of recording medium, for example, CD and DVD, and the improvement of storage capacity in such a portable type of recording medium becomes an important problem with the development of the digital technique and the information technology in recent years so far.

As one of the technologies for implementing a large storage capacity in a portable type of recording medium, there is proposed a holographic recording apparatus that records information in the medium (holographic memory) by using the technology of the hologram (For instance, refer to Japanese patent document 1: Japanese Patent Laid Open Gazette TokuKai. 2000-89650). According to this holographic recording apparatus, it is considered that a very large capacity of recording, for instance 200 GB, can be implemented with one recording medium in such a way that the information light and the reference light interfere with one another on the medium and the interference is recorded in the medium.

In order to implement a large capacity of recording with such a holographic recording apparatus, it is necessary that as the reference light used for the information recording, two or more sorts of reference lights, which are different from one another in incident angle, wavelength, and phase, are used, and information is recorded on a multiple basis by the reference light of two or more kinds in the same part in the medium. A capacity of medium is determined by a recording area and a multiple number. In the use of the recording medium, it is necessary to use it in accordance with the specifications of the multiple numbers provided by the standard beforehand (It is called a multiple number of specifications).

However, regarding also the recording medium such as conventional CD and DVD, it often happens that non-standard goods that do not meet the specification of the standard are done the manufacturing sales and circulate. It is thought that such non-standard goods might circulate about the holographic memory too. Moreover, even in case of the medium that meets the specification of the standard when manufacturing it, it might not meet the specification of the standard by an unexpected exposure and the like after selling.

The use of the holographic memories of the specification shortages as mentioned above in the conventional holographic recording apparatus brings about a problem that the recording error of data is caused and reliability decreases, and also a problem that the existing data is destroyed by a multiple record. Those problems are very serious problems in connection with a matter that the holographic memory is especially for a large capacity.

DISCLOSURE OF THE INVENTION

In view of the foregoing, it is an object of the present invention to provide a holographic recording apparatus capable of implementing a certainty of data recording and a safety of the existing data, even if the medium of specification shortages is used.

To achieve the above-mentioned object, the present invention provides a holographic recording apparatus that records information in a holographic memory on a multiple basis, the holographic recording apparatus including:

a multiple number check section that checks an actual multiple number with which information is safely recorded, in a holographic memory as an object of recording of information; and a recording section that records information in the holographic memory within a range of the multiple number confirmed with the check by the multiple number check section.

According to the holographic recording apparatus of the present invention as mentioned above, information is recorded on the holographic memory within a range of the multiple number confirmed with the check by the multiple number check section. This feature makes it possible to implement a certainty of data recording and a safety of the existing data, even if the medium of specification shortages in multiple number is used.

In the holographic recording apparatus according to present invention as mentioned above, it is preferable that the recording section records not only information on the holographic memory, but also a multiple number in recording of the information.

This feature makes it possible to avoid useless reproduction operation and useless multiple number check by referring to the multiple number stored in the holographic memory, at the time of reproduction and at the time of the subsequent recording.

In the holographic recording apparatus according to the present invention, it is acceptable that the recording section records information on the multiple basis in the holographic memory by projecting each of reference lights to the holographic memory with each of angles of a number not above than the multiple number.

In the holographic recording apparatus according to the present invention, it is acceptable that the recording section records information on the multiple basis in the holographic memory by projecting each of two or more reference lights to the holographic memory with each of phase states of a number not above than the multiple number.

In the holographic recording apparatus according to the present invention, it is acceptable that the recording section records information on the multiple basis in the holographic memory by projecting to the holographic memory a reference light of non-parallel luminous flux and shifting an irradiation range of the reference light by an amount according to the multiple number while partially overlapping the irradiation ranges.

As mentioned above, according to the holographic recording apparatus of the present invention, it is possible to implement a certainty of data recording and a safety of the existing data, even if the medium of specification shortages is used.

BEST MODE FOR CARRYING OUT THE INVENTION

Before the embodiments of the present invention are described in conjunction with the drawings, first, there will be explained a principle of a multiple recording for a holographic memory.

Figure 1:
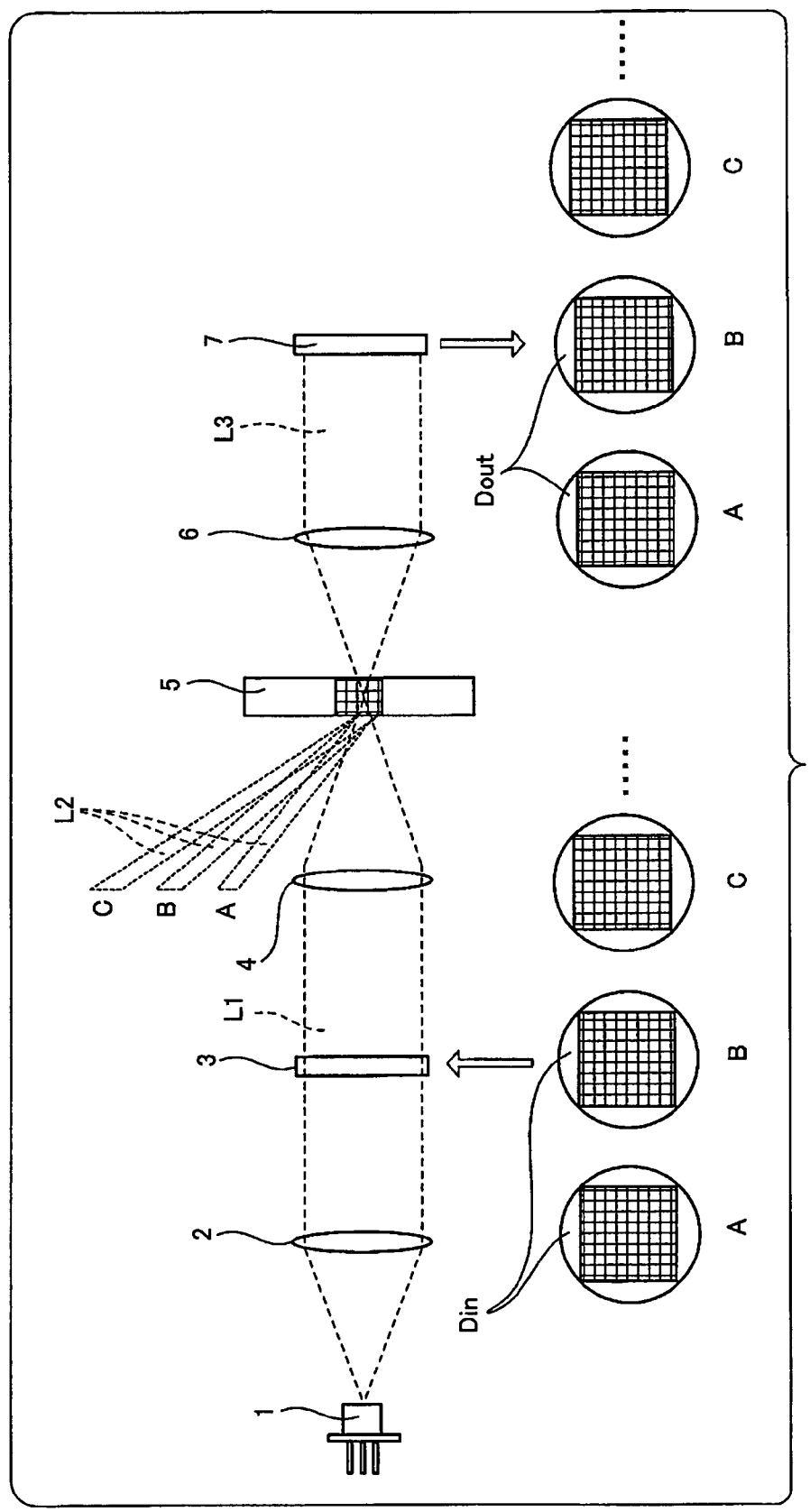
FIG. 1 is a view useful for understanding a principle of a multiple recording for a holographic memory.

FIG. 1 is a view useful for understanding a principle of a multiple recording for a holographic memory.

A laser light emitted from a light source 1 is converted through a collimator lens 2 into a parallel light flux, and then passes through a special light modulator (SLM) 3. The special light modulator (SLM) 3 is composed of the liquid crystal, for instance. Upon receipt of input of recording page data Din representative of information for a plurality of pages A, B, C, . . . , the special light modulator (SLM) 3 sequentially generates two-dimensional patterns representative of individual pages A, B, C, . . . with binary values of transmission/non-transmission. When the laser light passes through such two-dimensional patterns, it is possible to sequentially obtain two or more recording information lights L1 associated with two or more pages A, B, C, . . . , respectively, which carry information with a strength pattern of light intensity. Those two or more recording information lights L1 are projected through an object lens 4 onto a common recording area on a holographic memory 5. Projected onto the common recording area are also two or more reference lights L2 associated with two or more pages A, B, C, . . . , respectively, which are emitted from a light source similar to the light source 1. Those two or more reference lights L2 are mutually different in irradiation angle, wavelength, or phase. The reference lights L2 for individual pages are projected onto the recording area in synchronism with the recording information lights L1 for individual pages, so that a plurality of pages of interference pattern of the reference lights L2 with the recording information lights L1 is recorded in the recording area in the multiple.

Thus, when the reference light L2 for a desired page in reproduction is projected to the recording area in which the interference patterns are recorded in the multiple, the interference pattern of the associated page brings about diffraction and interference on the reference light L2, so that a reproduction information light L3 equal to the recording information light L1 of the associated page is generated. Thus generated reproduction information light L3 is converted into parallel light with an object lens 6, and the strength pattern is read with a two-dimensional array detector 7, so that reproduction page data Dout, which represents information of the above-mentioned two or more pages A, B, C, . . . , can be obtained.

As mentioned above, according to the holographic memory, the use of the reference lights L2, which are different from one another in irradiation angle and the like, makes it possible to perform a multiple recording for information. Thus, it is possible to implement a very large storage capacity of recording medium.

Figure 2:
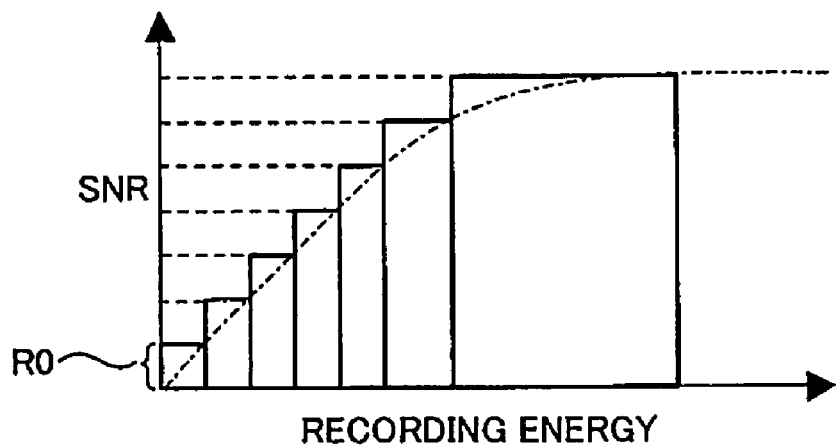
FIG. 2 is a graph useful for understanding a multiple number for an information recording.

FIG. 2 is a graph useful for understanding a multiple number for an information recording.

A horizontal axis in this graph shows a recording energy that depends on both the magnitude of quantities of the reference lights L2 and the recording information lights L1 and the lengths of the exposure time. A vertical axis of the graph shows signal noise ratio (Signal Noise Ratio; SNR) of the data recorded by the recording energy.

It is necessary to record data to obtain SNR of necessary SNR or more so that the data recorded in the holographic memory is normally reproduced. The graph shows a value "RO" corresponding to the necessary SNR. Moreover, in order to normally reproduce data even if the data is recorded in the multiple, it is needed that the record energy is increased whenever the data is multiplexed, and data is recorded with high SNR to which the amount of the addition of necessary SNR or more is added. However, the upper bound (allowance SNR) exists in SNR that can be achieved with the holographic memory, and it is difficult to exceed the allowance SNR even if it records by very large record energy. Therefore, the multiple number obtained by dividing the allowance SNR with necessary SNR becomes an upper bound wherein data can be recorded in the holographic memory on a multiple basis.

The specification is provided for allowance SNR and the like to standardize storage capacity and the like before the commercialization of the holographic memory and the like. However, inferior goods that fail to satisfy the specification of allowance SNR at the manufacturing stage and the like and the deterioration goods that have decreased allowance SNR because of the preservation environment after the manufacturing might exist together in the holographic memories that actually circulate.

Figure 3:
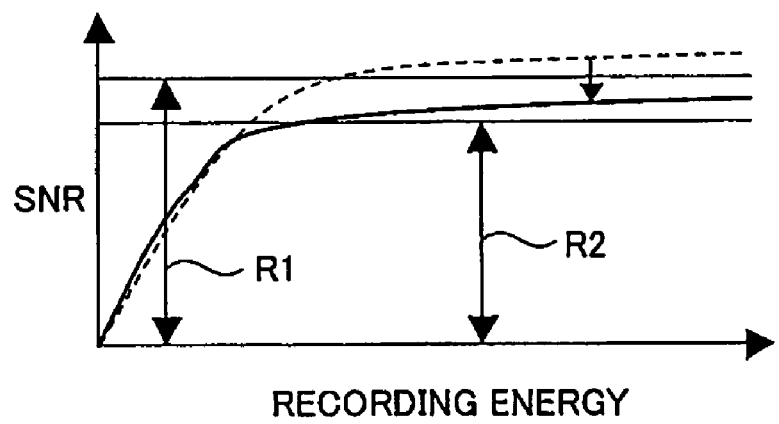
FIG. 3 is a graph useful for understanding a state that a permissible SNR is lowered.

FIG. 3 is a graph useful for understanding a state that a permissible SNR is lowered.

Also in the graph of FIG. 3, a horizontal axis shows a recording energy and a vertical axis shows signal noise ratio.

This graph shows by the dotted line the characteristic curve in an original holographic memory that satisfies a specification value "R1" of an allowance SNR provided by the standard. On the other hand, the characteristic curve in inferior goods and the deterioration goods that do not satisfy the specification of the standard is shown by the solid line. From the graph, it will be understood that in inferior goods and the deterioration goods, reaching the ceiling of SNR to an increase in the record energy is caused earlier than an original holographic memory, and value "R2" of allowance SNR that is lower than the specification value "R1" is possessed. In the event that data is recorded with high recording energy for inferior goods and the deterioration goods, there is a possibility that not only a desired multiple number is not obtained, but also the data, which is already recorded in the same record area by low recording energy, is destroyed. The data destruction is a serious problem because the holographic memory is a recording medium which has an extremely large storage capacity. On the other hand, when all information records of inferior goods and deterioration goods are prohibited to evade the information destruction, it comes to ruin the user's big expectation for the storage capacity of the holographic memory. Therefore, there is desired an information record according to a possible multiple number by range of allowance SNR in inferior goods and deterioration goods. In the following explanation, the multiple number in the specification is referred to a multiple number of specifications, and the multiple number achieved by the holographic memory of the reality for this multiple number of specifications is referred to a real multiple number.

Figure 4:
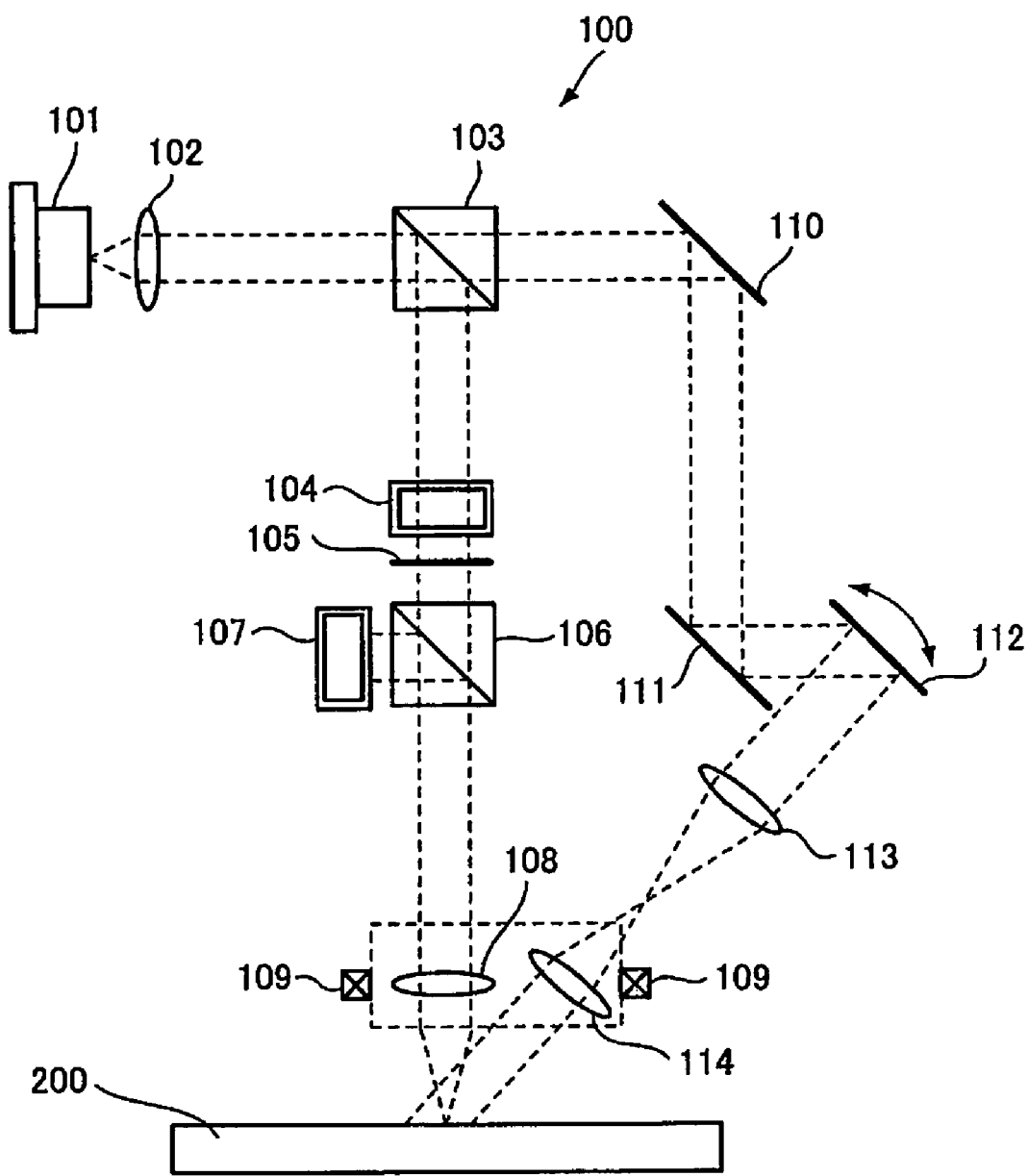
FIG. 4 is an illustration useful for understanding a first embodiment of a holographic recording apparatus of the present invention.

FIG. 4 is an illustration useful for understanding a first embodiment of a holographic recording apparatus of the present invention. It is noted that FIG. 4 mainly shows an optical system of the holographic recording apparatus.

According to a holographic recording apparatus 100 of the first embodiment, a reflection type of holographic memory 200 records in accordance with an angle multiplexing system. The holographic memory 200 is a so-called portable type of medium. What the user of holographic recording apparatus 100 bought are loaded in the apparatus and used.

The holographic recording apparatus 100 has a light source 101 which is common to the recording information light and the reference light. The light source 101 consists of the laser diode that generates the laser light of the diffusion luminous flux. The laser light, which is emitted from the light source 101, is converted through a collimator lens 102 into a parallel luminous flux, and then divided by a first beam splitter 103 into recording information light use and the reference light use.

The laser light for the recording information light toward from the first beam splitter 103 to the lower side of this figure becomes recording information light carrying information with the strength pattern of light intensity in such a way that it transmits a spatial optical modulator 104 that makes two-dimensional pattern of transmission/non-transmission in accordance with the principle similar to the liquid crystal display of black and white. The recording information light is incident upon an object lens 108 via a switching shutter 105 that opens at the time of recording and closes at the time of reproduction, and a second beam splitter 106 that divides a light path into a light path at the time of recording and a light path at the time of reproduction, so that the light condensed by the object lens 108 is projected onto a recording area of the holographic memory 200. The object lens 108 has been positioned by a lens servo 109. The lens servo 109 has both a focus servo for positioning the object lens 108 to the holographic memory 200 in the direction of approach and alienation and a tracking servo for positioning the object lens 108 in the direction along the surface of the holographic memory 200.

The laser light for the reference light toward from the first beam splitter 103 to the right side of this figure reaches a galvano-mirror 112 that is adjustable in a reflection angle through two mirrors 110 and 111, so that it is reflected by the galvano-mirror 112. Thus, the laser light for the reference light becomes the reference light in which the angle is adjusted. Therefore, the reference light with any angle may be irradiated to the recording area mentioned above by passing through a pair of relay lenses 113 and 114.

The spatial optical modulator 104 receives an input of recording data representative of a plurality of pages of recording information, and creates a plurality of recording information lights carrying information for individual pages. Those recording information lights are projected on an overlapping basis onto the same recording areas by a multiple number allowable for the holographic memory 200. The galvano-mirror 112 creates the same number of reference light as the multiple numbers, which are mutually different in an angle, by reflecting the laser light with the same number sorts of angles as the multiple numbers.

Since the holographic memory 200 used in the present embodiment is of a reflection type, the recording information light and the reference light are projected on the same side of the holographic memory 200.

Figure 5:
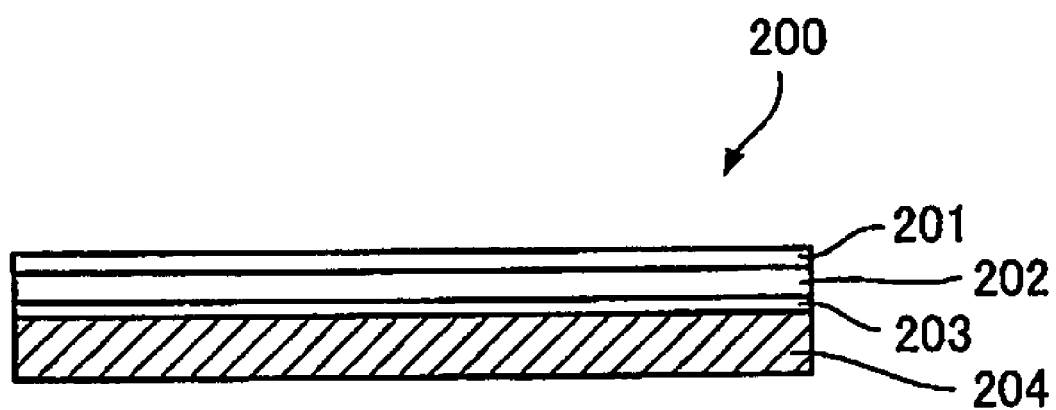
FIG. 5 is a structural view of a holographic memory used for the holographic recording apparatus according to the first embodiment of the present invention.

FIG. 5 is a structural view of a holographic memory used for the holographic recording apparatus according to the first embodiment of the present invention.

According to the holographic memory 200, a reflection film 203 is provided on a substrate 204. A holographic recording layer 202 and a protection layer 201 are formed on the reflection film 203. At the time of recording of information for the holographic memory 200 having the reflection film 203, the recording information light and the reference light are projected from the upper part in this figure so that an interference pattern is recorded in the holographic recording layer 202. At the time of reproduction of information, the reference light is projected from the upper part in this figure, so that diffraction and interference by the interference pattern of the holographic recording layer 202 are caused, and the reproduction information light that travels to the upper part in the figure is generated.

As the shape of holographic memory 200, the disk type and the card type so on can be applied. According to the present embodiment, the holographic memory 200 of disk type is adopted. The holographic memory 200 of disk type is different from the optical disk and the magnetic disk in the point that the disk is not rotated and the holographic memory 200 stands still while a plurality of pages of information is recorded in multiple on one recording area, or while such a plurality of pages of information is reproduced. When a recording reproduction of information for one recording area is terminated and shifts to the subsequent recording area, the holographic memory 200 temporarily moves and the object lens 108 is positioned by the lens servo 109 shown in FIG. 4.

Returning to FIG. 4, the explanation will be continued.

At the time of information reproduction, the switching shutter 105 closes, so that only the reference light is projected onto the holographic memory 200. At that time, the angle of the reference light is adjusted to anyone of two or more angles used at the time of recording, so that the holographic memory 200, which is subjected to the irradiation of the reference light, generates reproduction information light carrying reproduction information of the page associated with the angle. This reproduction information light is light reproduced as if the recording information light is reflected by the holographic memory 200 and be returned. The reproduction information light carries information with a strength pattern of the light intensity.

The reproduction information light is collected with the object lens 108, reflected by the second beam splitter 106, and led to a two-dimensional image sensor 107. The two-dimensional image sensor 107 reads the strength pattern of the light intensity of the reproduction information light to output reproduction data.

Figure 6:
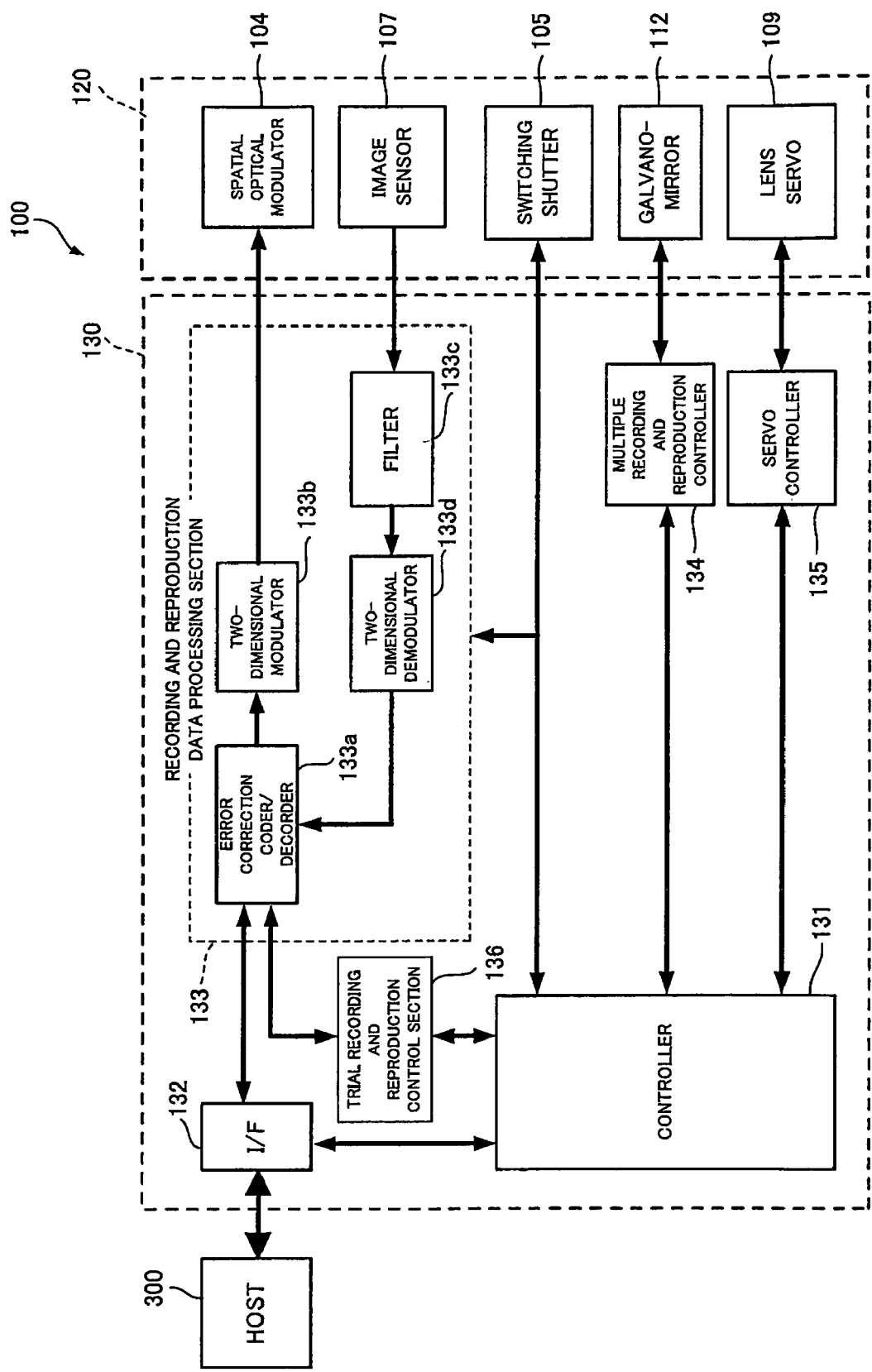
FIG. 6 is a functional block diagram of the holographic recording apparatus according to the first embodiment of the present invention.

FIG. 6 is a functional block diagram of the holographic recording apparatus according to the first embodiment of the present invention.

The holographic recording apparatus 100 has a signal processing system 130 as well as the optical system 120 which is described in detail in conjunction with FIG. 4. The signal processing system 130 is connected to a host apparatus 300 such as a personal computer. Upon receipt of an input of recording information from the host apparatus 300, the signal processing system 130 outputs reproduction information to the host apparatus 300.

The signal processing system 130 of the holographic recording apparatus 100 includes: a controller 131 for controlling operations of the holographic recording apparatus 100 in its entirety; an interface 132 that is in charge of communication of information with the host apparatus 300; a processing section 133 for performing processing of recording data and reproduction data; a multiple recording and reproduction controller 134 for controlling a multiplexing of information through control of the galvano-mirror 112; a servo controller 135 that controls the focus servo and the tracking servo which are included in the above-mentioned lens servo; and a trial recording and reproduction control section 136 that controls a trial record and reproduction for the holographic memory. First of all, there will be explained the fundamental motion of the signal processing system 130.

The controller 131 receives an instruction of information recording and an instruction of information recording reproduction from the host apparatus 300 via the interface 132. When information is recorded, the switching shutter 105 is opened, and the processing section 133 is controlled to receive the recording information. The processing section 133 receives recording information from the host apparatus 300 via the interface 132. As a result, an error correction coder/decoder 133a applies an error correction coder, and a two-dimensional modulator 133b provides a two-dimensional pattern to generate recoding data. This recoding data is fed to the spatial optical modulator 104 to generate the recording information light as explained in conjunction with FIG. 4. The controller 131 instructs the multiple recording and reproduction controller 134 to control the galvano-mirror 112 so as to obtain the reference light associated with the page of the two-dimensional pattern represented by the recording data, and instructs the servo controller 135 to control the lens servo 109 so that the recording information light and the reference light are projected on a predetermined recording area.

On the other hand, when the information is reproduced, the controller 131 causes the switching shutter 105 to close, and instructs the servo controller 135 to control the lens servo 109 so that the reference light is projected onto a recording area of the reproduction object, and instructs the multiple recording and reproduction controller 134 to control the galvano-mirror 112 so as to obtain the reference light associated with the page of the reproduction object. As a result, the two-dimensional image sensor 107 outputs reproduction data representative of the two-dimensional pattern corresponding to information of a desired page. Thus, it is possible to obtain the information of the page with the error correction code when the information of the page passes through a filter 133c and a two-dimensional decoder 133d. Thereafter, the error correction coder/decoder 133a decodes the error correction coder so as to obtain proper reproduction information corrected in error. The proper reproduction information is transmitted via the interface 132 to the host apparatus 300.

To the above-mentioned fundamental motion, the holographic recording apparatus 100 according to the present embodiment confirms the above-mentioned real multiple number and executes an upper limit deciding operation that decides the upper limit of the multiple number. The upper limit deciding operation is begun properly when a new holographic memory is loaded into the holographic recording apparatus 100, and is executed under the control by the trial recording and reproduction control section 136.

Figure 7:
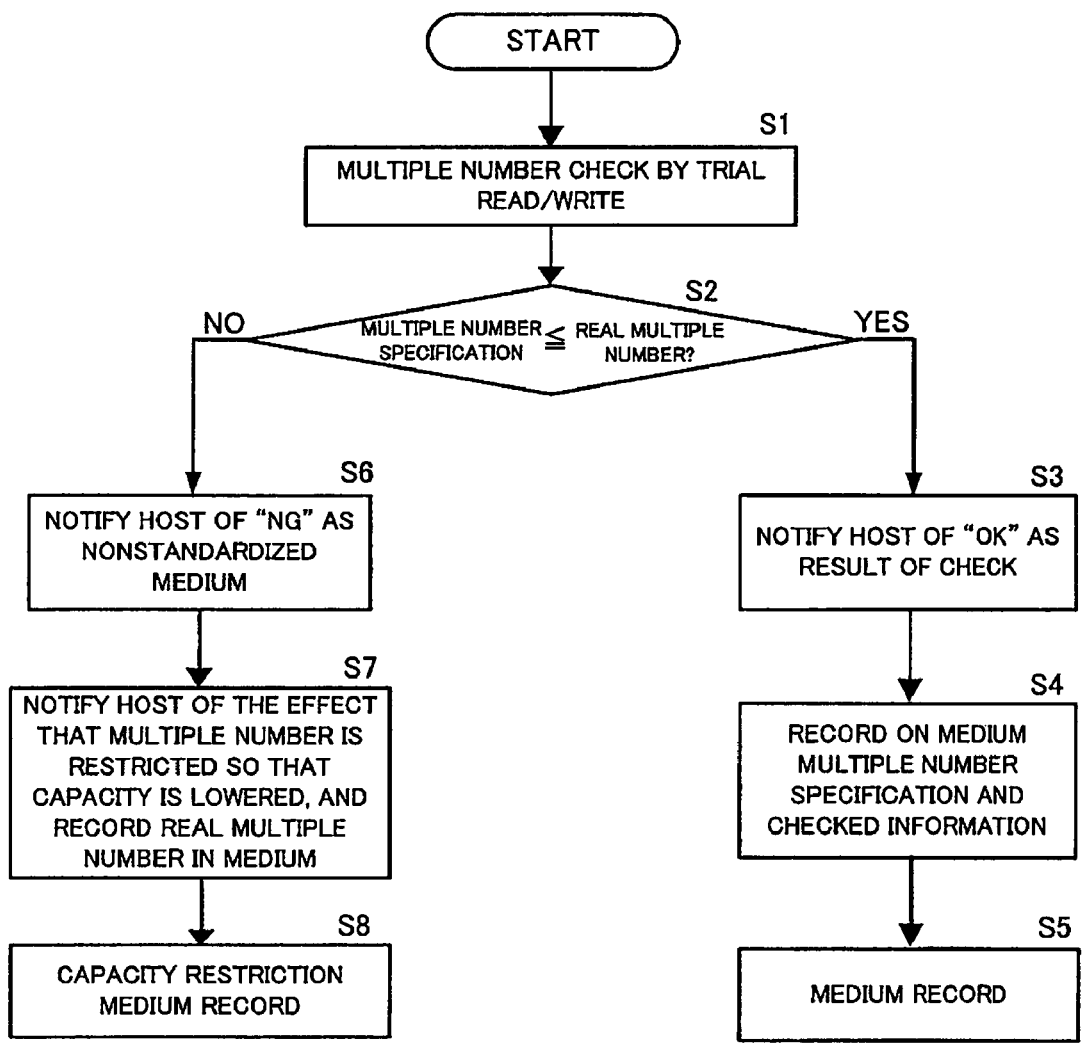
FIG. 7 is a flowchart useful for understanding a confirmation operation.

FIG. 7 is a flowchart useful for understanding the upper limit deciding operation. Regarding the explanation of this flowchart, there will refer to the elements shown in FIG. 6 without especially noting the figure's number.

According to the upper limit deciding operation, first of all, the trial recording and reproduction control section 136 creates test data, and checks the real multiple number using the test data as explained hereafter (step S1).

Figure 8:
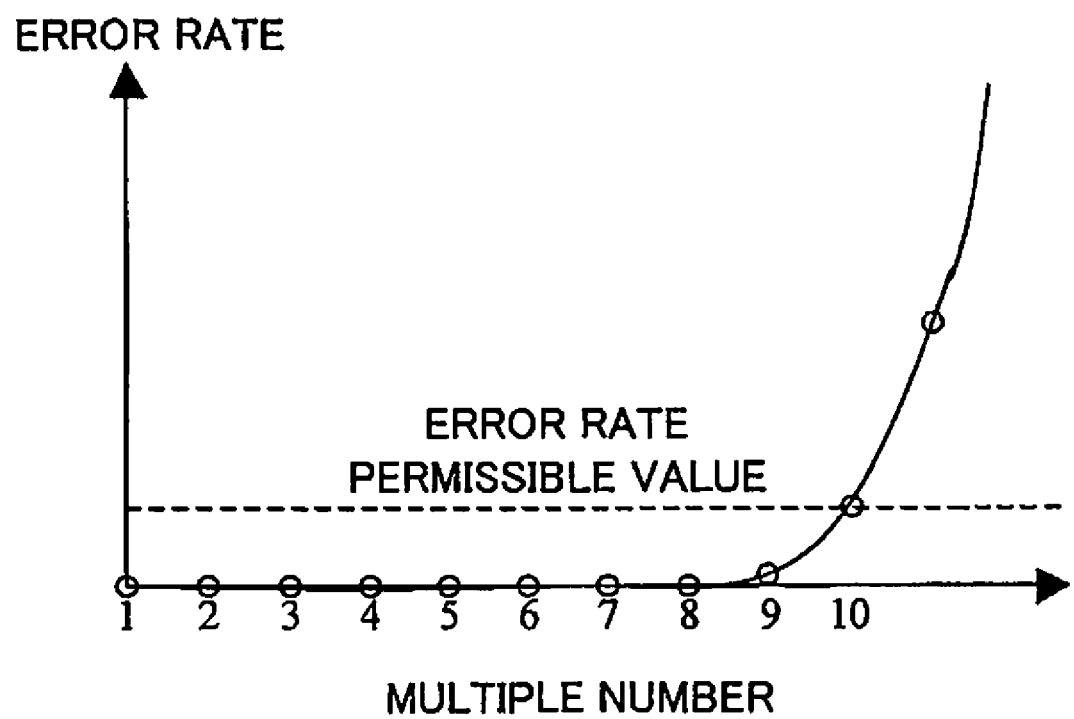
FIG. 8 is an explanatory view useful for understanding a method of inspection of a real multiple number.

FIG. 8 is an explanatory view useful for understanding a method of inspection of a real multiple number.

According to the inspection of the real multiple number in the present embodiment, there is performed a trial recording in which a multiple number is sequentially varied from one to a multiple number in the specification, in a predetermined test area on the holographic memory, and there is reproduced information recorded by way of trial with individual multiple number. Thus, an error rate is measured in accordance with individual recording information and individual reproduction information. As a concrete measurement method of the error rate, well-known, various methods can be adopted, and thus a detailed explanation is omitted here.

In the graph of FIG. 8, the horizontal axis denotes a multiple number of the trial recording as mentioned above, and the vertical axis denotes the error rate.

Even in case of the holographic memory that doesn't satisfy a multiple number in the specification, in general, when a multiple number is little, the reproduction of the record of information is normally done and the error rate is less than the permissible value, but when a multiple number exceeds the real multiple number, the error rate rises rapidly and exceeds the permissible value. According to FIG. 8, when the multiple number becomes "10", the error rate rises rapidly. A confirmation of the zoom of such an error rate makes it possible that a multiple number ("9" in this example) before the zoom is confirmed as the real multiple number.

In the manner as mentioned above, according to the inspection method of the present embodiment, the trial recording of the test data is actually performed with individual multiple numbers so as to confirm the error rate. Thus, this feature makes it possible to exactly obtain the real multiple numbers. To the contrarily, according to the present invention, it is possible to apply also an inspection method in which a trial recording with only a specification multiple number is performed, the recorded information is reproduced to measure SNR, and the maximum multiple number, with which the above-mentioned necessary SNR can be obtained, is estimated in accordance with the measure SNR. For the estimation of the maximum multiple number, there is used the general association between the multiple number increment and the SNR decrement. This association is determined beforehand experimentally by a normal holographic memory etc. Therefore, this inspection method has the advantage that the trial recording to be executed at the time of inspection can be a little.

Incidentally, it is desired that the test data used for the trial recording is data representative of an inspection pattern that is easy for a measurement of SNR and the error rate at the time of the reproduction. It is necessary for such an inspection pattern that a special light modulator is able to create it in form of two-dimensional arrangement of turn-on and turn-off of pixels. As this type of pattern, there are raised, for example, a pattern in which two or more isolation patterns where the interference between pixels is not caused are arranged on a two-dimensional basis, and a pattern in which the turning on pixels and the turning off pixels are arranged so that the ratio of the number of each of the turning on pixel and turning off pixel becomes an integer ratio. Moreover, the one with a mutually different element when do the Fourier transform of each pattern is used for the pattern on each page recorded in the multiple.

Now returning to FIG. 7 there will be continued the explanation.

When the real multiple number is checked in step S1, the real multiple number is compared with a multiple number of specifications (step S2). When the real multiple number is not less than the multiple number of specifications (step S2; YES), the host apparatus 300 is notified of the fact that the inspection result is satisfactory from the trial recording and reproduction control section 136 via the interface 132 (step S3). Upon receipt of this notification, the host apparatus 300 recognizes that it is available for the memory capacity in the specification. Moreover, the inspected holographic memory records in a predetermined management area information that indicates a multiple number of specifications and the effect that it has been inspected (step S4). The controller 131 is permitted to be used up to the multiple number of specifications regarding the basic operation mentioned above (step S5).

On the other hand, when the real multiple number is less than the multiple number of specifications (step S2; NO), the host apparatus 300 is notified of the fact that the inspection result is unsatisfactory from the trial recording and reproduction control section 136 via the interface 132 (step S6). Moreover, the host apparatus 300 is notified of the effect that the multiple number is restricted to the real multiple number of the holographic memory. The real multiple number is recorded in the management area (step S7). And, it instructs the controller 131 to perform the basic operation limited to the real multiple number (step S8). Upon receipt of this instruction, the controller 131 instructs the multiple recording and reproduction controller 134 to provide such a control that a variation of the angle of the reference light is the same as the real multiple number. Specifically, according to the present embodiment, an alteration interval of the angle between the reference lights is always constant and the range of the angle is limited, so that the upper limit of the multiple number is controlled. To the contrarily, according to the present invention, it is acceptable to adopt a system in which the range of the angle is substantially constant, and the alteration interval of the angle is expanded, so that the upper limit of the multiple number is controlled. Thus, the restriction of the multiple number to the real multiple number makes it possible to keep the safety of information even in case of inferior goods and deterioration goods of specification shortage, and secure storage capacity to some degree. Therefore, a user can use it without fear of the information destruction, and can enjoy to some extent a large storage capacity expected of the holographic memory.

The explanation of the first embodiment of the present invention is ended above, and, in the following, there will be explained other embodiments of the present invention. The repetition explanation will be omitted by fixing the same reference sign about the component similar to the component in the first embodiment with respect to the explanation of other embodiments.

Figure 9:
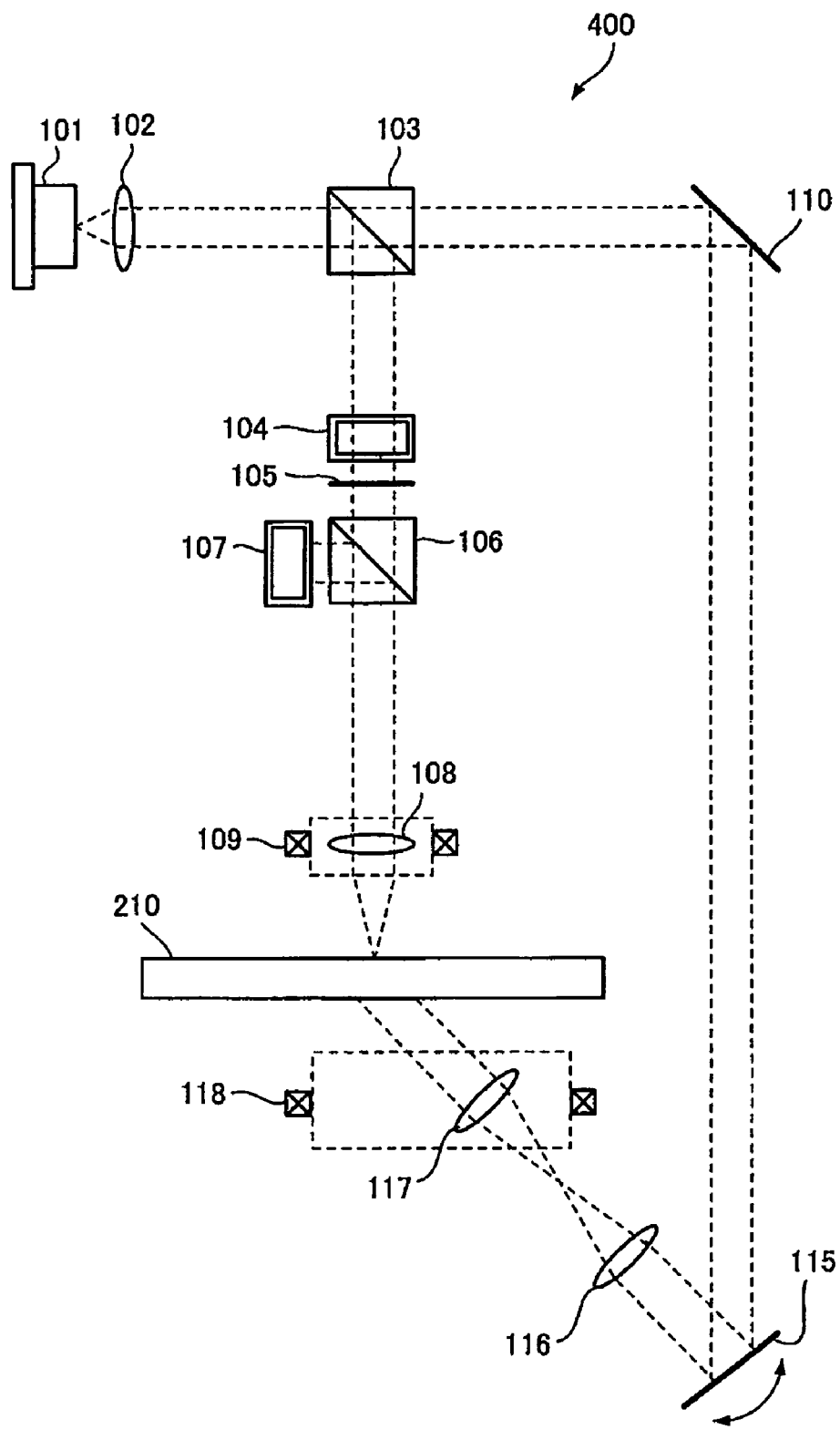
FIG. 9 is an illustration useful for understanding a second embodiment of a holographic recording apparatus of the present invention.

FIG. 9 is an illustration useful for understanding a second embodiment of a holographic recording apparatus of the present invention.

According to a holographic recording apparatus 400 of the second embodiment, a transmission type of holographic memory 210 is used. The reference light is irradiated from the side opposite to the recording information light to the holographic memory 210 through a galvano-mirror 115 and a couple of relay lenses 116 and 117. Moreover, the holographic recording apparatus 400 is provided with a lens servo 118 for the relay lens 117 as well as a lens servo 109 for an object lens 108.

When the galvano-mirror 115 regulates the reflection angle, there are generated two or more reference lights which are mutually different in traveling angle, and those two or more reference lights are irradiated onto the common recording area through the couple of relay lenses 116 and 117 so that information is recorded on a multiple basis.

Figure 10:
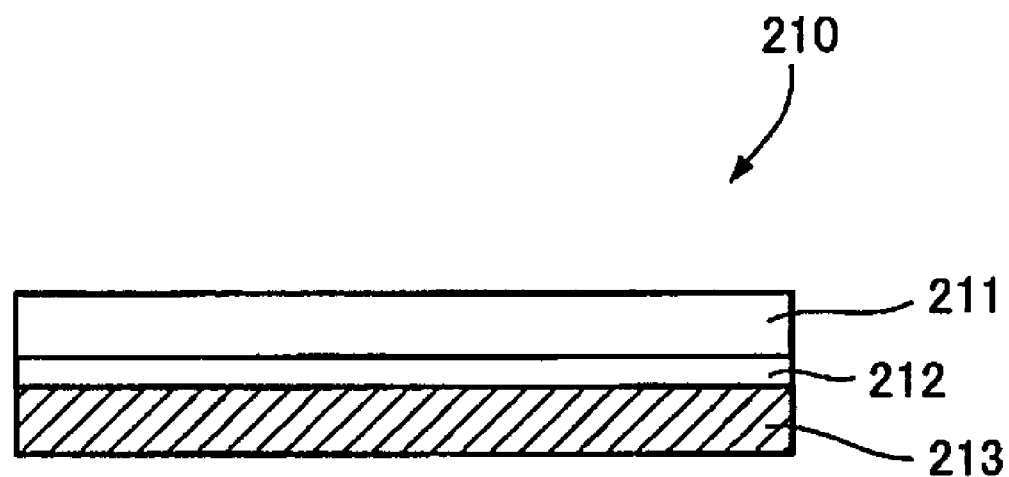
FIG. 10 is a structural view of a holographic memory used for the holographic recording apparatus according to the second embodiment of the present invention.

FIG. 10 is a structural view of a holographic memory used for the holographic recording apparatus according to the second embodiment of the present invention.

According to the holographic memory 210, a holographic recording layer 212 and a protection film 211 are formed on a transparent substrate 213. When information is recorded, an interference pattern is recorded in the holographic recording layer 212 by the recording information light and the reference light being irradiated respectively the top and bottom of this figure. When information is reproduced, diffraction and interference are generated owing to the interference pattern on the holographic recording layer 212 by the reference light being irradiated from the bottom of this figure. Thus, in a similar fashion to that of the first embodiment, there is created the reproduction information light traveling upward the figure. In this manner, according to the holographic recording apparatus 400 shown in FIG. 9, recording and reproduction of information is possible for a transmission type of holographic memory.

Also in the holographic recording apparatus 400 of the second embodiment, the multiple number control, which is quite similar to the multiple number control in the first embodiment, is performed, and when inferior goods and the deterioration goods of specification shortages of a multiple number are used, a multiple number is limited. As a result, the safety of information and the certainty of the information record are kept.

The first embodiment and the second embodiment are common in the point that the recording scheme where multiplexing is implemented by two or more reference lights each with a mutually different irradiation angle is adopted, though the irradiation direction of the reference light in the holographic recording apparatus 400 is opposite to the irradiation direction of the reference light in the first embodiment.

Here, there will be explained a variation of a recording system in the holographic recording apparatus.

Figure 11:
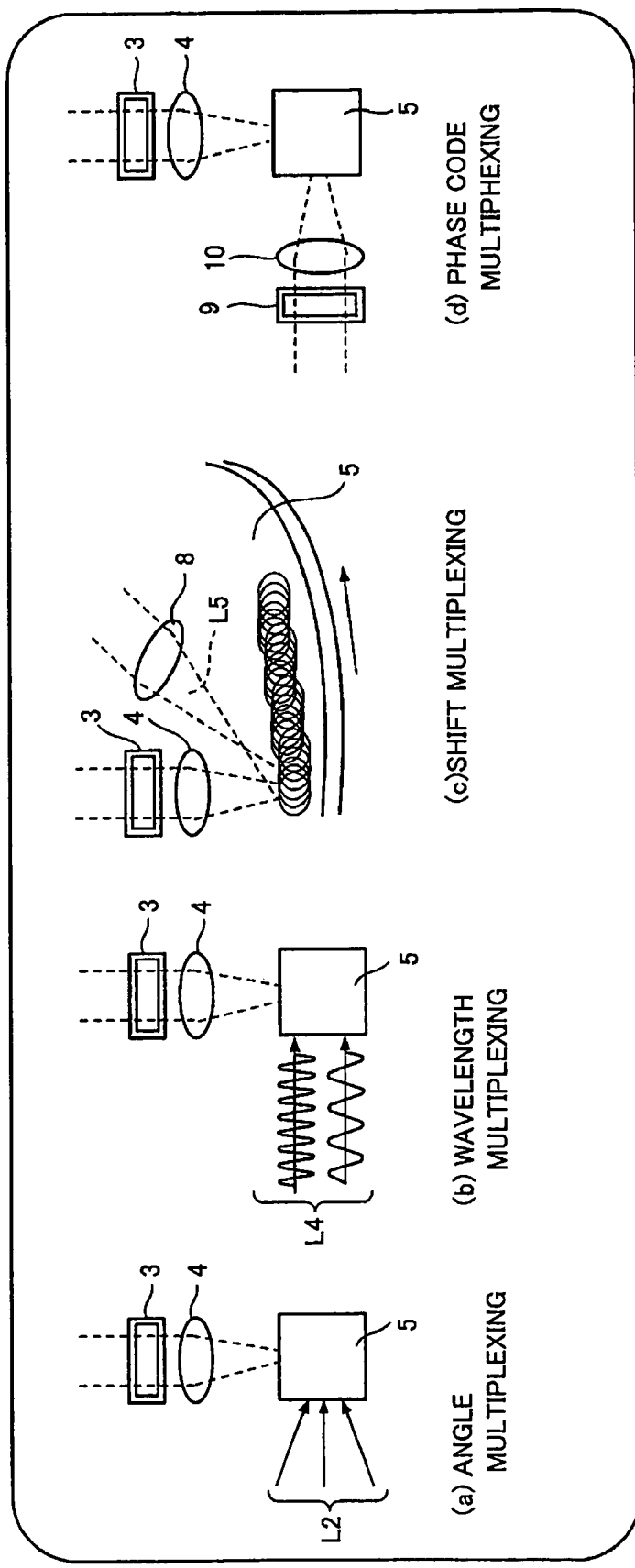
FIG. 11 is an illustration useful for understanding variations of a recording system in which information is recorded on a multiple basis.

FIG. 11 is an illustration useful for understanding variations of a recording system in which information is recorded on a multiple basis.

In FIG. 11, the same parts are denoted by the same reference numbers as those of FIG. 1.

FIG. 11 shows four recording systems as variations of the recording system, which four recording systems are common in the recording information light, and are generated with the special light modulator 3, and projected to the holographic memory 5 with the object lens. As for the reference light, a different one in each system is used.

A part (a) of FIG. 11 shows an angle multiplexing system which is adopted in the above-mentioned first embodiment and second embodiment. As mentioned above, according to the angle multiplexing system, two or more reference lights L2, which are mutually different in irradiation angle, are used to record information on a multiple basis.

A part (b) of FIG. 11 shows a wavelength multiplexing system. According to the wavelength multiplexing system, two or more information lights and reference lights L4, which are mutually different in wavelength, are used to record information on a multiple basis. Such two or more information lights and reference lights L4, which are mutually different in wavelength, are generated by two or more laser diodes and the like. Therefore, the holographic recording apparatus according to the wavelength multiplexing system is complicated in the structure.

A part (c) of FIG. 11 shows a shift multiplexing system. According to the shift multiplexing system, the object lens 8 for the reference light creates a reference light L5 having the diffusion luminous flux to be used for recording and reproduction. Moreover, the holographic memory 5 is shifted so that recording areas where each reference light is irradiated may shift little by little as the recording areas are not completely coincident with one another, and the recording areas overlap each other. Here, there will be explained the third embodiment adopting the shift multiplexing system.

Figure 12:
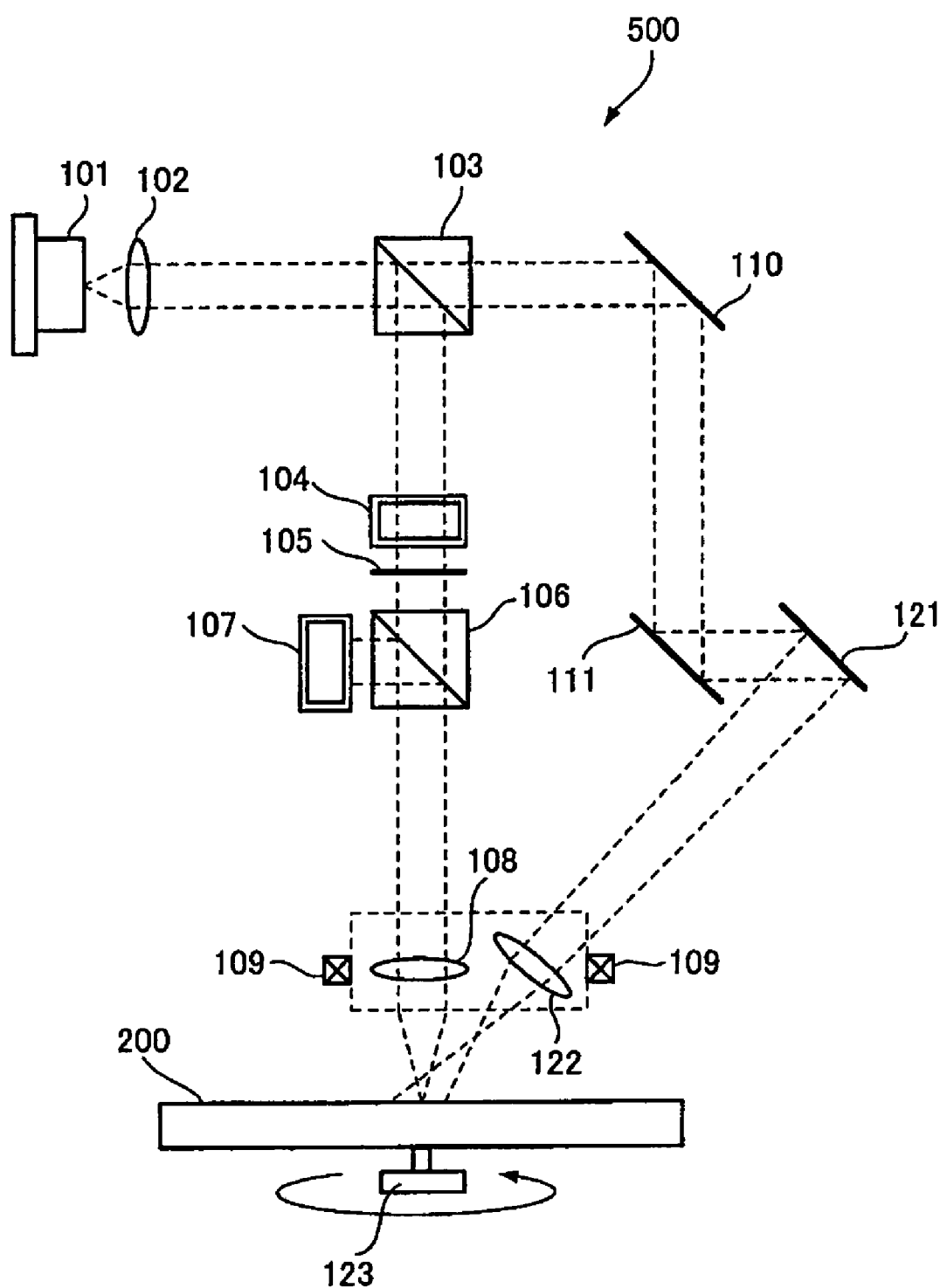
FIG. 12 is an illustration useful for understanding a third embodiment of a holographic recording apparatus of the present invention.

FIG. 12 is an illustration useful for understanding a third embodiment of a holographic recording apparatus of the present invention.

According to a holographic recording apparatus 500 of the third embodiment, the laser beam for reference light is reflected by two mirrors 110 and 111 and further reflected on a fixed mirror 121, so that the reference light having the diffusion luminous flux is created by an object lens 122 for reference light. The common reference light is used for recording and reproduction. According to the third embodiment, the holographic memory 200, which is the same as the holographic memory used in the first embodiment, is used, but it is different from the first embodiment in the point that the holographic memory 200 is rotated by a motor 123. The recording and reproduction for a page of information is instantaneously performed to extent to be able to disregard the rotation of holographic memory 200 by the use of the recording information light and the reference light which are strong to some degree. When the recording area is shifted by a page in accordance with the rotation of holographic memory 200, the recording and reproduction for the subsequent page is performed. A local traveling direction of the reference light comes to differ in each page, and comes for information to be multiplexed as well as an angle multiplexing system locally even if the recording area overlaps if such a shift is done to the reference light of the diffusion luminous flux.

According to the shift multiplexing system adopted in the third embodiment, a permission of the use of the common reference light makes it possible to provide a simple structure of the optical system. Moreover, a control of a multiple number is implemented by the shift amount control on each page, and the multiple number is limited by the shift amount being controlled greatly in inferior goods and deterioration goods. The control of the shift amount is performed by the multiple recording and reproduction controller 134 shown in FIG. 6.

Now returning to FIG. 11, there will be explained another variation of the recording system.

A part (d) of FIG. 11 shows a phase code multiplexing system. According to the phase code multiplexing system, information is recorded on a multiple basis using two or more reference lights L6 which are mutually different in a phase code representative of a two-dimensional phase distribution in a section of the luminous flux. A phase code modulator 9 creates the reference lights L6 which are mutually different in a phase code. The reference lights L6 are projected via the object lens 9 for the reference light to the holographic memory 5. Here, there will be explained the fourth embodiment adopting the phase code multiplexing system.

Figure 13:
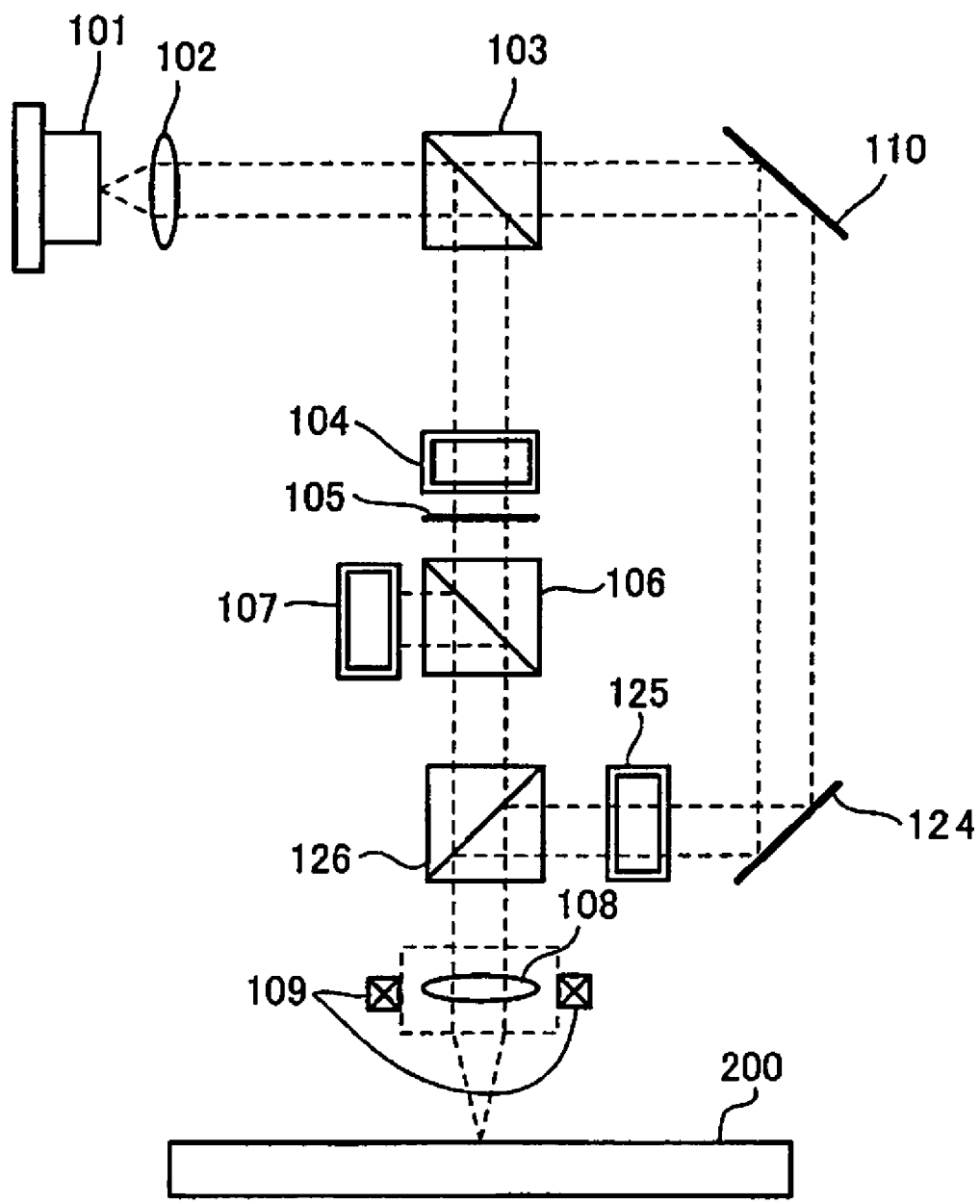
FIG. 13 is an illustration useful for understanding a fourth embodiment of a holographic recording apparatus of the present invention.

FIG. 13 is an illustration useful for understanding a fourth embodiment of a holographic recording apparatus of the present invention.

According to a holographic recording apparatus 600 of the fourth embodiment, the laser light for the reference light is reflected by two reflection mirrors 110 and 124, and passes through a phase code modulator 125, so that two or more reference lights, which are mutually different in the phase code, are generated. The phase code modulator 125 has a similar structure to removing the deflecting plate where a liquid crystal layer is placed with the liquid crystal display. According to the phase code modulator 125, when a voltage is applied with a predetermined two-dimensional pattern to the liquid crystal layer, the phase code according to the two-dimensional pattern is given to the passage light, so that two or more phase states can be obtained as set forth. The multiple recording and reproduction controller 134 shown in FIG. 6 performs the control of the voltage as mentioned above.

Figure 14:
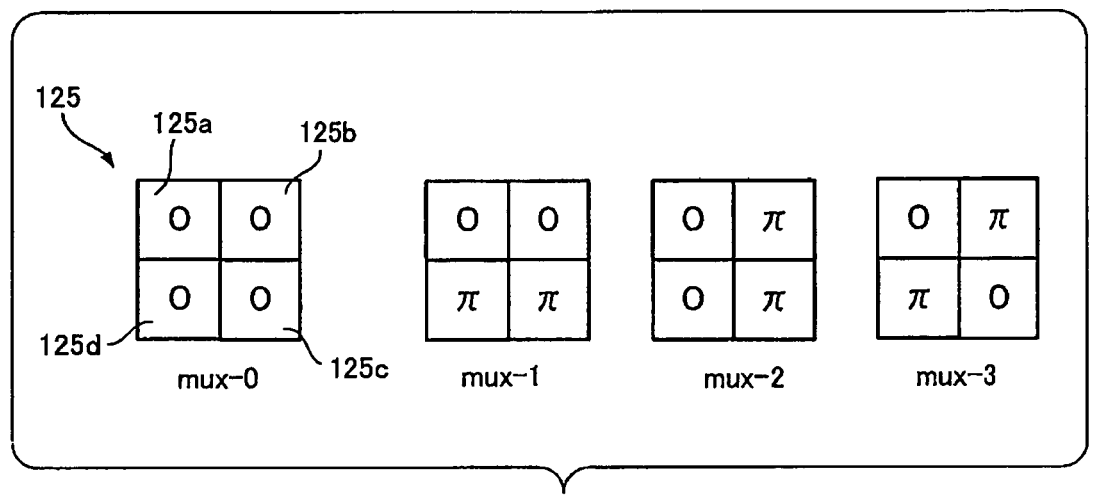
FIG. 14 is a view showing examples of a plurality of phase states.

FIG. 14 is a view showing examples of a plurality of phase states.

FIG. 14 shows the states when the phase code modulator 125 is seen in the direction where light is passed. The lights pass through four areas 125a, 125b, 125c, and 125d, respectively. The lights, which enter into these four areas 125a, . . . , and 125d, are laser lights which are in phase uniformly with one another in the section of luminous flux. When the voltages are applied to the liquid crystal layers of individual areas 125a, . . . , and 125d of the phase code modulator 125, the phase state of the light after passage offers a two-dimensional phase distribution state (phase code) which consists of a phase state "0" that is the same phase state at the incident time, and a phase state "π" that is shifted by 180 degree from the phase state at the incident time. FIG. 14 shows exemplarily 4 phase codes mux-0, mux-1, mux-2, and mux-3, and the phase codes being in order such as (0,0,0,0), (0,0,π,π), (0,π,π,0), and (0,π,0,π) from the left side of the figure. The combination use of two or more reference lights having those two or more phase codes with pages of information makes it possible to discriminate the interference patterns which are generated with individual reference lights, so that information is recorded on a multiple basis.

Now returning to FIG. 13, there will be continued the explanation.

The reference light generated with the phase code modulator 125 is led to the same optical path as the optical path of the recording information light with an optical path synthesis element 126 to which the beam splitter is diverted and irradiated to the holographic memory 200.

On the other hand, the reproduction information light that can be gained from the holographic memory 200 goes straight in the optical path synthesis element 126, and is led to a two-dimensional image sensor 107 through a second beam splitter 106.

According to the fourth embodiment, the restriction of the number of the phase codes that are used in the phase code modulator 125 causes the multiple number to be restricted.

The certainty of the data recording and the safety of existing data are implemented by limit according to real multiple number of holographic memories being done to a multiple number of information even in case of which recording scheme as mentioned above.

What is claimed is:

1. A holographic recording apparatus that records information in a holographic memory on a multiple basis, the holographic recording apparatus comprising:

a multiple number check section that checks an actual multiple number with which information is safely recorded, on a holographic memory as an object of recording of information; and a recording section that records information in the holographic memory within a range of the multiple number confirmed with the check by the multiple number check section.

2. The holographic recording apparatus according to claim 1, wherein the recording section records not only information on the holographic memory, but also a multiple number in recording of the information.

3. The holographic recording apparatus according to claim 1, wherein the recording section records information on the multiple basis in the holographic memory by projecting each of reference lights to the holographic memory with each of angles of a number not above than the multiple number.

4. The holographic recording apparatus according to claim 1, wherein the recording section records in multiple information on the multiple basis in the holographic memory by projecting each of two or more reference lights to the holographic memory with each of phase states of a number not above than the multiple number.

5. The holographic recording apparatus according to claim 1, wherein the recording section records information on the multiple basis in the holographic memory by projecting to the holographic memory a reference light of non-parallel luminous flux and shifting an irradiation range of the reference light by an amount according to the multiple number while partially overlapping the irradiation ranges.

* * * * *

UNITED STATES PATENT AND TRADEMARK OFFICE
CERTIFICATE OF CORRECTION

PATENT NO. : 7,486,424 B2
APPLICATION NO. : 12/153821
DATED : February 3, 2009
INVENTOR(S) : Toshikazu Kanaoka et al.

Page 1 of 1

It is certified that error appears in the above-identified patent and that said Letters Patent is hereby corrected as shown below:

On the Title Page, below
Item "(65)          Prior Publication Data
               US 2008/0231923 A1    Sep. 25, 2008" insert
Item --(63)          Related U.S. Application Data
Continuation of application No. PCT/JP2005/021531, filed Nov. 24, 2005.--.

Signed and Sealed this

Twenty-sixth Day of May, 2009

JOHN DOLL
*Acting Director of the United States Patent and Trademark Office*